United States Patent [19]

Dower

[11] 4,367,477
[45] Jan. 4, 1983

[54] RATE OF PENETRATION RECORDER

[75] Inventor: Ethell J. Dower, Comfort, Tex.

[73] Assignee: Warren Automatic Tool Company, Houston, Tex.

[21] Appl. No.: 260,585

[22] Filed: May 6, 1981

[51] Int. Cl.³ .......................... G01D 9/00; E21B 45/00
[52] U.S. Cl. ............................... 346/33 WL; 73/151.5
[58] Field of Search ................... 346/33 WL; 73/151.5

[56] References Cited

U.S. PATENT DOCUMENTS

| 2,980,486 | 4/1961 | Melton | 346/33 |
| 3,010,777 | 11/1961 | Melton et al. | 346/33 |
| 3,076,966 | 2/1963 | Suter et al. | 346/33 |
| 3,220,251 | 11/1965 | Pearson | 346/33 WL X |

Primary Examiner—Donald A. Griffin
Attorney, Agent, or Firm—Arnold, White & Durkee

[57] ABSTRACT

An apparatus for measuring the rate of movement of one object with respect to another, such as a drilling rate recorder used to measure the rate of penetration of a drill bit during drilling operations. One embodiment of the invention includes a frame, a motion imparting means for imparting motion from a drill string; a first arm having one end pivotally mounted on the frame, a second arm pivotally mounted on the first arm, a first cam attached to the motion imparting means and adapted to cause the second arm to pivot about the first arm, and a recording means.

10 Claims, 7 Drawing Figures

RATE OF PENETRATION RECORDER

BACKGROUND OF THE INVENTION

1. Field of the Invention

This invention relates to a new and impoved apparatus for measuring the rate of movement of one object with respect to another. More particularly, this invention relates to a new and improved apparatus for measuring and recording the rate of penetration of a drill bit as it proceeds downwardly during oil well drilling operations.

2. Description of the Prior Art

During the operation of many industrial systems it is often beneficial, if not essential, to measure the rate of movement of one object with respect to another. For example, in the oil and gas well drilling industry, it is desirable to continually monitor and record the rate of penetration of the rotary drill bit as it proceeds through the various formations of the earth. This rate is often used as a tool to determine the drilling efficiency under variable operating conditions and the nature and characteristics of the individual formations which assist in the evaluation of potential hydrocarbon bearing zones.

Many times it is possible to measure the progress of a drill bit or other device if one can obtain accurate and meaningful measurements of the movements of any lines attached directly or indirectly to the drill bit or other device. This is particularly so with regard to a rotary drilling rig. Since the rotary drive member or kelly of a rotary drilling rig is attached directly to the upper portion of the drill string, its vertical movement with respect to the derrick floor is equal to the movement or penetration of the drill bit. Thus, a number of devices have been used to measure the movement of a cable attached at one end to the conventional tackle mechanism of the rotary drill rig in order to determine the progress of the drill bit. Such devices generally use measuring wheels to impart the movement of the cable to a drive shaft, which in turn imparts its motion to a pen arm through a complex series of levers, members and gears.

One such device is disclosed by Suter in U.S. Pat. No. 3,076,966, which employs a planet-sun gear mechanism to impart the motion of a drive shaft to an angular pen arm and provides an apparatus for disconnecting the pen arm from the measuring wheels and indicating this condition on a chart. However, Suter fails to provide for an adjustment of scale while drilling occurs. Additionally, the rate of progress of the drill bit or other device is not readily obtained from the chart, since only a series of independent marks is produced and manual calculations are requred to determine the rate either at any particular instant or over a period of time. Such manual calculations have been found to be not only inefficient, but also conducive to error.

Melton, U.S. Pat. Nos. 2,980,486 and 3,010,777, employs an integrally mounted five-point star actuating member and a cam in conjunction with a collar placed upon a drive shaft with arms extending from the collar to impart the motion of the drive shaft to a pen arm shoe and hence to the pen arm. Although Melton U.S. Pat. No. 3,010,777 provides for an adjustment to scale during drilling, this is only accomplished through an additional series of shafts, gears and arms. Additionally, devices described in both of these patents produce a series of marks in a manner analogous to other prior art devices, such that the rate of penetration of the drill bit is not readily obtained.

The foregoing, as well as other prior art devices, also suffer from other defects. For example, the pen arm is not designed to produce a particularly flat set of chart grid lines so as to facilitate comparison of other variables being recorded on a drum chart. Additionally, in order to disconnect the recording mechanism, prior art devices rely on purely mechanical links, which are necessarily located on the recording apparatus.

SUMMARY OF A PREFERRED EMBODIMENT OF THE INVENTION

The present invention provides an apparatus which effectively overcomes the deficiencies noted above. According to the invention, a drilling rate recorder is provided comprising a frame, motion imparting means for imparting motion of a drill string, a first arm having one end pivotally mounted to the frame of the recorder, a second arm pivotally mounted on the first arm, a cam positioned so as to cause the second arm to pivot about the first arm, recording means and a means for disconnecting the second arm from engagement with the first cam. In one embodiment, the surface of the cam is graduated so as to cause a steady, lateral movement of the first arm which is communicated through the second arm to the recording means.

As a chart moves vertically within the recording means, lateral movement of a writing implement attached to the second arm produces a sloped line, which unlike prior art devices, indicates the instantaneous rate of progression of the drill bit. The slope of the line also indicates the rate of penetration of the bit. Additionally, as the graduated surface of the cam ends abruptly in a notch, the writing implement repeatedly returns to its original position, thus producing a sawtooth graph which indicates in discrete intervals the distance traveled by the drill bit.

In another embodiment, a second cam is designed to cause the first arm to briefly pivot at predetermined intervals, thus causing sharp lateral movements in the second arm. Thus, the second cam when used in conjunction with the first cam produces a graph with interim markings along the sloped line.

BRIEF DESCRIPTION OF THE DRAWINGS

Reference to the drawings will further explain the invention wherein like numerals refer to like parts, and in which.

DETAILED DESCRIPTION OF A PREFERRED EMBODIMENT

The following description is directed toward the use of the subject invention in connection with an oil well drilling rig, but it should be understood that such an application is given only as an example. The subject invention is equally adaptable for use in any situation wherein it is desirable to measure the rate of movement of one object with respect to another.

Figure 5:
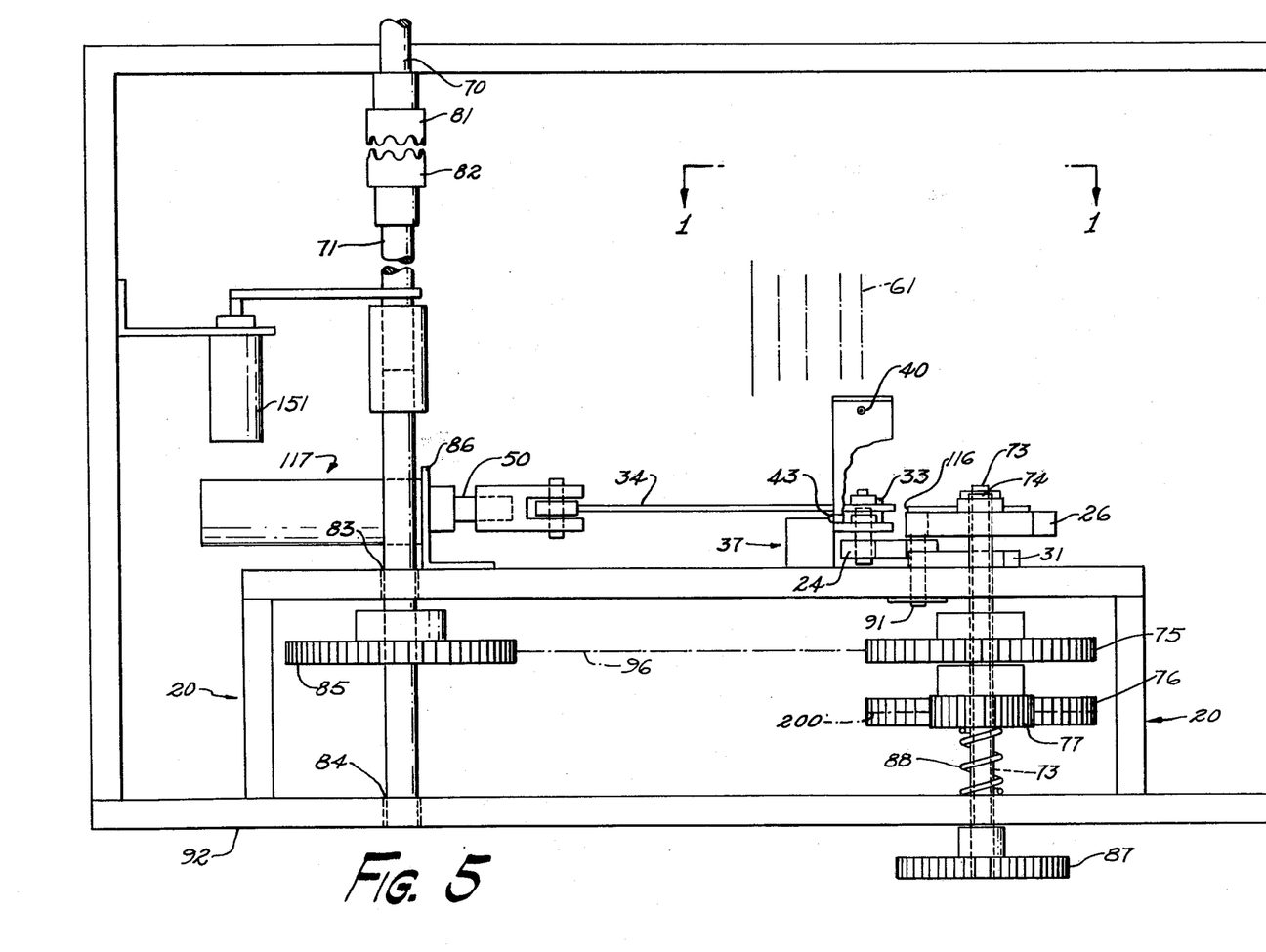
FIGS. 5 and 6 are top views of the drilling rate recorder of FIGS. 1-4 showing the apparatus in two modes of operation.
Figure 6:
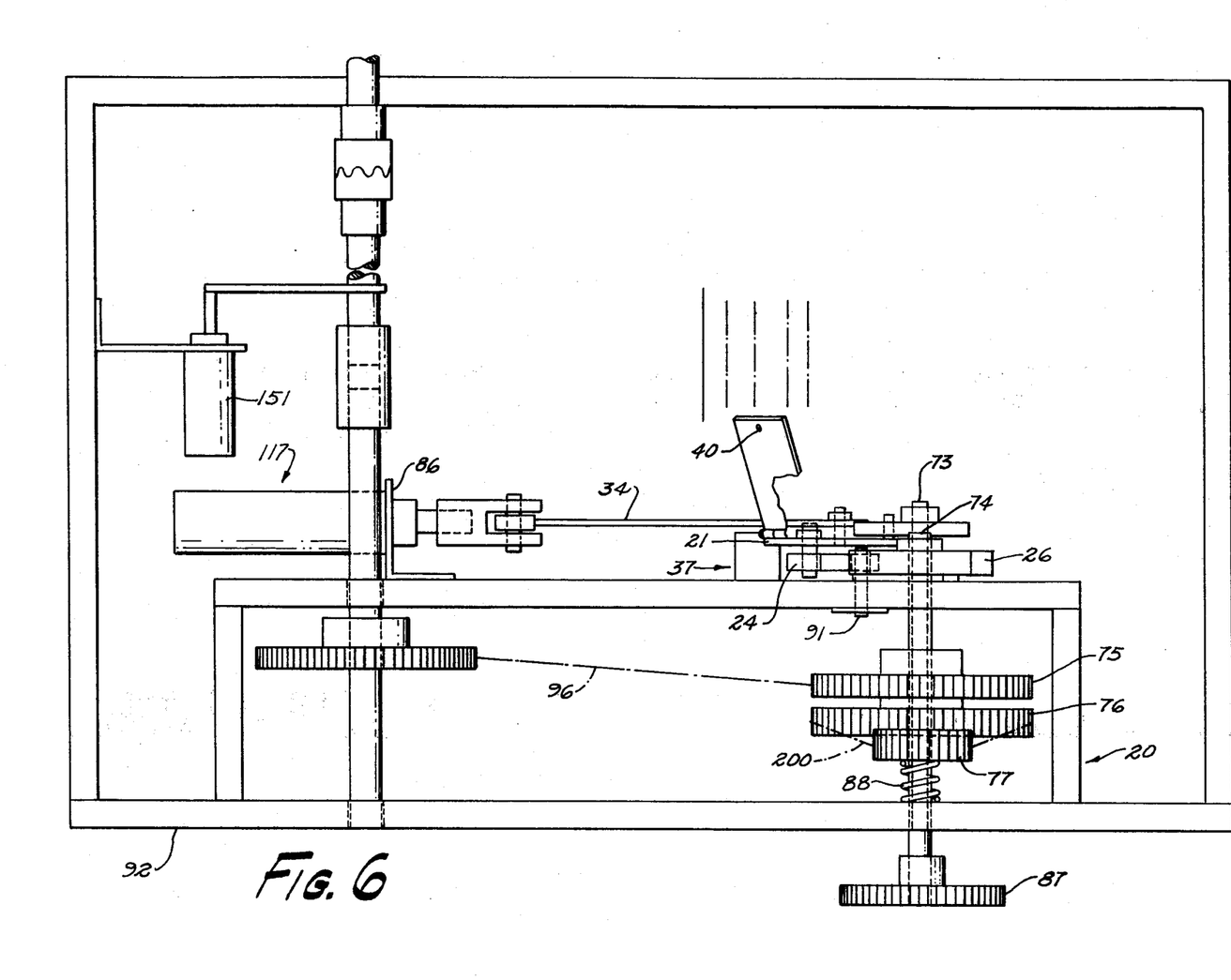

Referring first to FIGS. 5 and 6, a housing frame 20 is provided for mounting a pen arm mechanism and an associated mechanism of shafts and gears for imparting motion to the same. In the preferred embodiment, frame 20 consists of a rectangular housing which encases the various parts of the apparatus and protects them from the rugged environment of a drilling rig yet may be easily removed from the drilling rig for repair. The recorder includes a means for imparting rotary motion which is functionally related to the movement of the bit. In the present embodiment, this means includes a primary or first cable shaft 70 which is operatively connected to a cable (not shown) by any convenient means such as a spool or wheel (also not shown) or other suitable mechanism mounted on shaft 70 which is engaged by the cable such that any motion of the cable causes the shaft 70 to rotate. A one-way clutch mechanism (not shown) may also be employed between the cable spool and shaft 71 to automatically disengage the instrument when the bit is being pulled from the well. Typically, the cable is attached to the rotary drive member or kelly of a rotary drilling rig which moves vertically in proportion to the movement of the drill string and drill. As a result of this mechanical connection, the rotary motion of the first cable shaft 70 is directly proportional to the movement or penetration of the drill bit as it proceeds through the earth's crust.

The other end of the first cable shaft 70 is mounted so as to be rotatably coupled to a second shaft 71 through use of mating jaws 81, 82 shown in FIG. 5 or another appropriate coupling mechanism, to allow longitudinal movement of the shaft 70 in relation to shaft 71. As will be more fully described, the primary shaft 70 is partially mounted within the housing 20 so that it can be selectively engaged to the second shaft 71 by operation of air cylinder 151 and jaws 81, 82.

The second shaft 71 is journaled in both front panel 92 of frame 20 and the rear panel 93 at two points 83, 84. A sprocket wheel 85 is integrally mounted on the second shaft 71 within the frame 20 between points 83 and 84 as seen in FIG. 5. A chain loop 96 or other flexible line means loops around and engages the cogs of sprocket wheel 85 and the teeth on a link arm cam sprocket wheel 75 such that the rotary motion of the second shaft 71 is imparted to the link arm cam sprocket wheel 75 as with any standard chain and sprocket combination. As link arm cam sprocket wheel 75 is integrally mounted on link arm cam shaft 74, the rotation of the second shaft 71 causes the link arm cam shaft 74 to rotate in like fashion.

Figure 1:
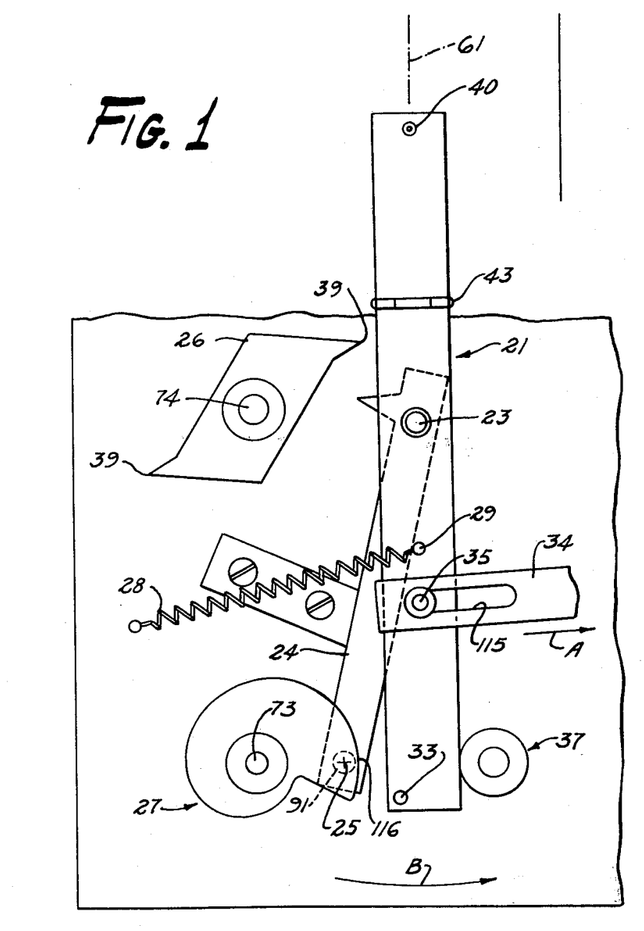
FIGS. 1-4 are cut-a-way rear elevations of the pen shifting mechanism of the drilling rate recorder showing an embodiment of the pen shifting mechanism in various modes or positions of operation.

Referring briefly to FIGS. 1 and 5, a pen arm cam shaft 73 is also axially mounted across frame 20 below shaft 74 so as to be in the same vertical plane as the link arm cam shaft 74. A link arm gear 77 is rigidly mounted on link arm cam shaft 74 and axially spaced from sprocket wheel 75 along shaft 74. A larger pen arm gear 76 is integrally mounted on the pen arm shaft 73 and vertically aligned with link arm gear 77 such that link arm gear 77 and the pen arm gear 76 may engage each other through a flexible chain loop 200 or directly with mating gear teeth. Thus, as shaft 74 is rotated one revolution by wheel 85 and chain 96, link arm gear 77 causes pen arm gear 76 to rotate a predetermined portion of one rotation. Also integrally mounted near one end of the link arm cam shaft 74 is a link arm cam 26 as seen in FIG. 1. A pen arm cam 27 is similarly mounted on pen arm cam shaft 73. As will be more fully described, the pen arm gear 76 turns a predetermined fraction of a rotation for each rotation of the link arm gear 77 such that the number of revolutions of the pen arm cam 27 is directly related to the number of rotations of the link arm cam 26.

Referring again to FIGS. 5 and 6, a post 91 is axially mounted to the rear panel 93 of the frame 20 with link arm 24 pivotally attached to post 91 such that the link arm 24 is free to pivot about post 91. A pen arm 21 is in turn pivotally mounted on the link arm 24 through means of a pivot pin 23, as shown in FIG. 1.

The pen shifting mechanism is shown in more detail in FIGS. 1 through 4. Reference is particularly made to FIG. 1, which is a plan view of the mechanism taken in the direction shown in FIG. 5. The link arm 24 is pivotally mounted on the panel 93, such that the link arm 24 is free to rotate about the fixed pivot point 25 at the centerline of shaft 91. As will be understood and more fully explained below, a link arm stop 31 and the pen arm 21, in conjunction with pen arm stop 37, all act to restrict the rotation of link arm 24 about the fixed pivot point 25.

As already noted, pen arm 21 is pivotally mounted to the link arm 24 by pin 23 such that in the absence of other restraints, pen arm 21 may rotate about pin 23. A second pin 35, fixed to pen arm 21, is used to connect a retracting link 34 to arm 21 and includes a longitudinal slot 115 into which pin 35 is positioned and free to slide as shown in FIG. 1.

Figure 2:
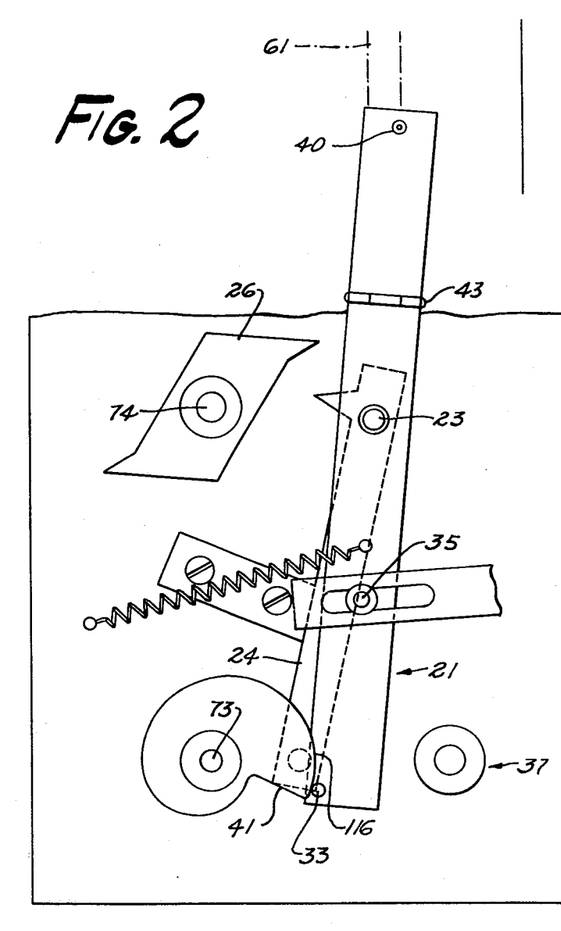
Figure 3:
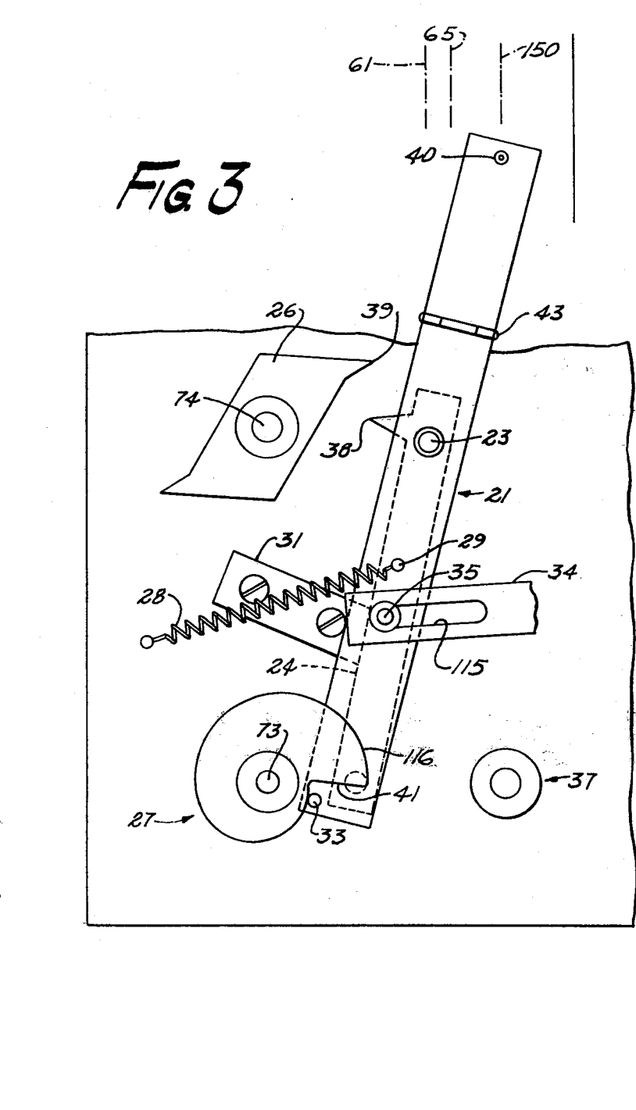
Figure 4:
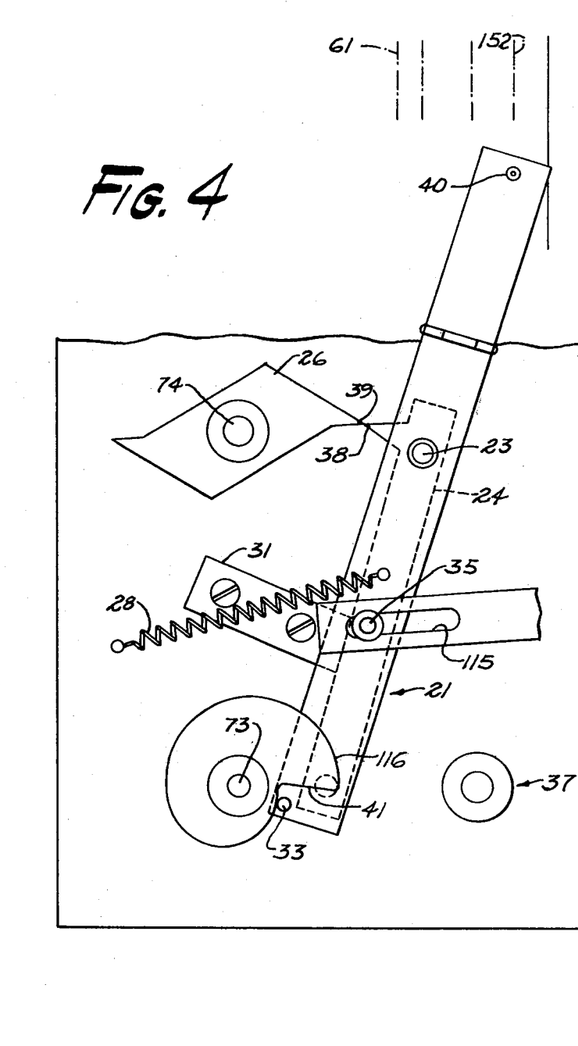

Thus, upon lateral movement of the retracting link 34 in the direction indicated by arrow A in FIG. 1, the end of slot 115 in retracting link 34 contacts pin 35 mounted on the pen arm 21 and causes the lower end of the pen arm 21 to rotate about the pin 23 in the direction of arrow B of FIG. 1. As can be seen by a comparison of FIGS. 1-3, the retracting link 34 is positioned so that its movement in the direction of arrow A, or away from the link arm stop 31, rotates the lower end of the pen arm 21 away from the pen arm cam 27 and toward the pen arm stop 37. (The position of FIG. 1.) However, movement of the retracting link 34 in the opposite direction, toward the link arm stop 31, allows a cam follower pin 33 mounted on the lower end of pen arm 21 to come into contact with the outer cam surface 116 of pen arm cam 27 as seen in FIG. 2. The pen arm cam 27 is spaced from link arm 24 such as, for example, in a vertical plane spaced further away from panel 93 than the link arm 24 (see also FIGS. 5 and 6) such that the link arm 24 will not prevent cam follower pin 33 from contacting the surface 116 of pen arm cam 27. Similarly, the link arm stop 31 is mounted on frame 20 in a different plane such that pen arm 21 is free to pass over link stop 31 as shown in FIGS. 3 and 4.

Still referring to FIGS. 1-4, a positioning spring 28 is attached at one end of its ends to frame 20 with the other end connected to pen arm 21 through use of a spring pin 29. Spring 28 is attached to pen arm 21 below the pivot pin 23 which connects pen arm 21 to link arm 24. The length of spring 28 is selected such that it is extended when the mechanism is in the position of FIG. 4. Therefore, spring 28 biases the lower end of pen arm 21 toward pen arm cam 27 causing pin 33 to contact and follow along cam surface 116. Thus, retracting link 34 and spring 28 may be used in concert to selectively bring the cam follower pin 33 in and out of contact with cam surface 116 of pen arm cam 27.

Referring to FIGS. 1-4, it can be appreciated that since cam follower pin 33 is biased by spring 28 into contact with cam surface 116 of cam 27, each revolution of pen arm cam 27 causes cam follower pin 33 to travel a lateral distance equal to the size of the lobe of the cam 27 or equivalent to the length of notch 41. The lateral movement of cam follower pin 33 in turn causes pen arm 21 to pivot about pin 23 and move a stylus or pen 40 located at the opposed end of arm 21 to move in lateral distance proportionate to the movement of pin 33 in an opposite direction. Therefore, as cam 27 is rotated one revolution, pen 40 is first caused to move slowly in a continuous, lateral direction, as pin 33 rides along surface 116. As pin 33 engages notch 41, pin 33 "drops" and causes pen 40 to return to its original position in a quick, continuous stroke in proportion to the length of notch 41. Therefore a sawtooth type line or chart is formed if pen 40 is allowed to contact a recording means such as a time advanced chart (see FIG. 7).

Link arm cam 26 is mounted in substantially the same plane as the link arm 24 and positioned such that each of its lobes 39 and the cam follower surface 38 located on link arm 24, briefly engage and release each other as cam 26 rotates about shaft 74 (as in FIG. 4) when slot 115 of retracting link 34 does not engage pin 35 and pen arm 21 is allowed to partially rotate from the position of FIG. 1 toward link arm stop 31. The link arm cam lobes 39 and the cam follower surface 38 are designed and positioned such that upon contact with one another, the upper portion of link arm 24 is forced to pivot to the right (as viewed in FIG. 4) in a direction away from the link arm stop 31 in short, sharp steps or strokes as cam 26 is rotated. Two such steps occur for each complete rotation of cam 26.

Referring back to FIGS. 5 and 6, the retracting link 34 is operatively connected to an air cylinder assembly 117 which includes cylinder rod 50. The air cylinder assembly 117 is mounted on the rear panel 93 of frame 20 through use of a bracket 86. Cylinder assembly 117 is a fluid actuated piston and cylinder arrangement such that link 34 may be selectively shifted by operation of assembly 117 as can be seen in FIG. 5. Assembly 117 is in fluid communication with a fluid reservoir and control system such that the operator of the apparatus can selectively shift cylinder assembly 117 and therefore link 34 as desired. The need for shifting assembly 117 will be more fully described subsequently.

The present invention also includes means connected to the frame for recording the movement of the pen arm 21 as it is selectively pivoted about pin 23 by the movement of cam 26 and about pin 25 by cam 27. In particular, the pen arm 21 of the embodiment of FIG. 1 is fitted at its upper end with a stylus or pen 40, or other appropriate writing implement. This embodiment employs a time advanced paper chart 36 mounted on a cylindrical drum (not shown). Pen arm 21 consists of an upper portion hingedly connected to a lower portion by hinge 43 which allows the upper portion of arm 21 and pen 40 to rest on the chart 36. Thus, as viewed in FIGS. 1-4, the upper portion of arm 21 is represented as extending upwardly from the plane of the drawing when hinged into position against chart 36. The hinged portion of arm 21 allows more effective engagement with the curved surface of the chart 36. Therefore, as arm 24 is pivoted, the effective length of arm 21 is altered by the hinging effect and a flat, lateral line is produced even though the pen 40 is really being arced about a pivot point.

Figure 7:
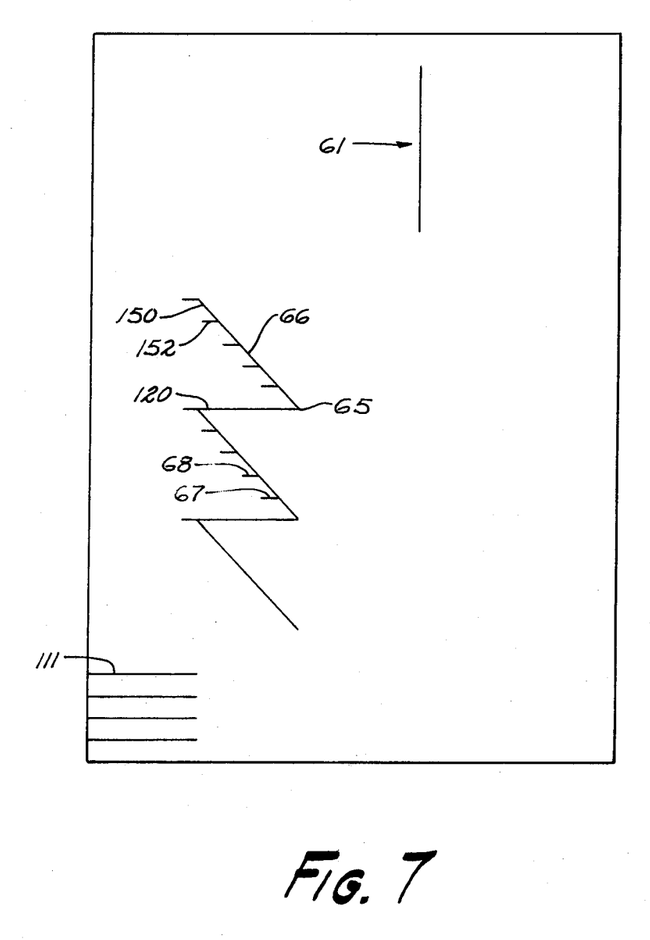
FIG. 7 illustrates a recording chart produced by the instrument during operations.

In FIG. 7, a portion of the graph or chart 36 created by the present invention is shown. The chart is preferably an elongated strip of flexible material such as paper which contains equally spaced marks 111 representative of units of time with periods such as 12 hours or 24 hours being appropriately marked.

Although not shown, the chart 36 may be removably supported on the outside surface of a drum which is mounted for rotation on a transverse shaft with appropriate mountings adjacent the pen arm 21. The drum engages the chart by any of several means and rotation of the drum caused the chart to advance at a controlled rate. Construction and function of such a strip chart and drum are well-known to those skilled in the art.

Returning to FIGS. 5 and 6, both link arm cam shaft 74 and pen arm cam shaft 73 are vertically aligned and journaled through frame 20 and their ends extending past front panel 92 of the frame 20 as viewed in FIGS. 5 and 6. Each shaft 73, 74 has circular knobs 87 or other means which the operator may use to control each shaft. Several arrangements of shaft 74 and accompanying gears are possible such that link arm cam 26 may be selectively placed in various vertical plans parallel to panel 93 such that cam 26 is placed in rotation at any given time. Such selective use of cam 26 allows the user to disengage cam 26 thereby eliminating the short, sharp steps or strokes caused by lobes 39 engaging surface 38 as previously explained. Thus a chart or graph can be produced with only the line formed by the movement of cam 27. By way of example and without limitation, a chart with marks which represent a change in distance of one foot may be desired in addition to marks or indicators representing 5 feet. Such a scale change is done by employing both cams 26, 27. If only five foot indicators are desired, cam 26 is disengaged by shifting shaft 74 and allowing only cam 27 to rotate and impart movement to link 24.

In the embodiment shown in FIGS. 5 and 6, link arm cam shaft 74 is mounted into the frame 20 such that it may be selectively shifted by the operator in an axial direction causing link arm cam 26 to disengage from the link arm 24. Thus, by the operator shifting shaft 74 axially, cam 26 may be selectively engaged with link arm 24.

A spring 88 is coiled about link arm cam shaft 74 between the frame 20 and lug 89 (see FIG. 5). As a result of spring 88, link arm cam shaft 74 is maintained in the position of FIG. 5 without operator adjustment so as to prevent the link arm cam 26 from engaging the link arm 24.

As more clearly seen in FIG. 6, the link arm cam shaft extends through frame 20 and is equipped with knob 87 which may be used to axially shift link arm cam shaft 74 against the urging of the spring 88. Thus, link arm cam 26 will only engage the link arm 24 when knob 87 is employed to shift link arm shaft 74 to the position of FIG. 6 against the urging of the spring 88. The present recording device may also include a means for locking shaft 74 into the shifted position of FIG. 6. For example, such means may take the form of a clip which engages shaft 74 after knob 87 has been used to pull shaft 74 axially. Also, shaft 74 itself may include a grove which is engaged by a lip in panel 92 to prevent axial movement.

As already noted, shaft 70 may be provided with a clutch mechanism (FIGS. 5 and 6) such that second shaft 71 may be selectively connected to first shaft 70 by the operator by shifting air cylinder 151. Therefore, through the use of air cylinders 117 and 151, operated simultaneously, it is possible to cause a shifting pen 40 to indicate the condition or position of air cylinder 151 and thereby record on the chart whether the instrument is operational.

OPERATION

Turning now to a description of the preferred embodiment of the invention, if the operator wishes to effectively disengage the instrument during operation, as for example, when the drill string is being pulled from the well, the instrument is placed in the "off-bottom" position partially shown in FIG. 1. This is done by activating air cylinder assembly 117 and air cylinder 151 and disengaging jaws 81, 82 and shifting retracting link 34 into the position shown in FIG. 1. Link 34 engages pin 35 and pivots the lower end of pen arm 21 away from pen arm cam 27 toward pen arm stop 37. As illustrated in FIG. 7, while pen arm 21 is in the "off-bottom" position, pen 40 is held in a fixed, single position which traces a straight line 61 on the chart 36 as the chart advances.

By shifting air cylinder assembly 117 and cylinder 151 and engaging jaws 81, 82 and retracting link 34 from the "off-bottom" position, the pen arm 21 is released and spring 28 biases arm 21 causing cam follower pin 33 to engage surface 116 of pen arm cam 27 as shown in FIG. 2. The pen arm 21 responds to the rotation of pen arm cam 27 by moving laterally as it is "raised" by cam 27. As chart 36 moves underneath pen arm 21 while arm 21 is being gradually shifted by cam 27, pen 40 traces sloping line 66 as shown in FIG. 7. As pin 33 encounters notch 41 of cam 27, the pin arm 21 rapidly shifts back to its original position thereby causing the transverse line 120 on chart 36 in FIG. 7.

As can be summarized, shaft 73 and cam 27 are rotated proportionally to the distance moved by the drill bit as it proceeds through the formations by the series of sprockets, gears and shafts 70, 71, 85, 75. These various gears are sized such that cam 27 is rotated one complete revolution each time the bit moves a predetermined distance, say for example, five feet. Applying this to the chart of FIG. 7, it can be understood that each sloping line 66 represents a distance of five feet drilled by the bit.

If link arm cam 26 is in the plane of link arm 24, or otherwise located such that cam lobes 39 of cam 26 contact cam follower surface 38 when rotated, link arm 24 and therefore pen arm 21 both shift or rotate sharply clockwise as viewed in FIG. 1. However, once lobe 39 is rotated past cam follower surface 38, pen arm 21 as quickly returns to the position of FIG. 2 dictated by pen arm cam 27. Thus, the rotation of link arm cam 26 produces a series of short, transverse lines 67, 68 shown in FIG. 7. Of course, the rotation of link arm cam 26 and pen arm cam 27 are properly synchronized to produce the appropriate markings. Thus, in producing the chart shown in FIG. 7, the abrupt transverse movement of the pen 40 caused by the notch 41 of pen arm cam 27 is synchronized with one of the short transverse strokes of pen arm 21 caused by link arm lobe 39 contacting cam follower surface 38. Thus, if properly sized and coordinated with both cams 26, 27 rotating, a graph is generated which includes a transverse line 67 for a unit of movement such as one foot of the bit which is coordinated and imposed upon a series of lines 66 which indicate say, for example, five feet intervals of movement of the bit. As also appreciated, since sloping line 66 of the chart represents five feet, the greater the slope of line 66, the faster or the greater the relative rate of penetration of the bit since the chart is time advanced.

As already discussed, link arm cam 26 may be selectively disengaged from contacting link arm 24 by removing it from the plane of the cam follower surface 38 by axially shifting link arm cam shaft 74 (see FIG. 6). In such a position, no short transverse lines 67, 68 are produced and only the sawtooth line 66 results.

Referring now to FIGS. 1, 5 and 6, the drilling recorder is fully operational when second shaft 71 engages first shaft 70 through shifting of cylinder 150 and the engagement of jaws 81, 82, and cylinder assembly 117 is in the extended position of FIG. 6. If shaft 74 is shifted as in FIG. 5, then only the sawtooth diagram 66 will result, since only pen arm cam 27 will be in contact with link arm-pen arm combination. However, when air cylinder 15 is shifted and cylinder assembly 117 is shifted, the instrument will be disengaged. Such disengagement is provided to accommodate large and repetitive movements associated with adding a joint of pipe or other operations which could cause a gross error and meaningless footage marks on the chart.

Correction of an odometer which may be mounted on the instrument and activated by the instrument may be accomplished by rotating knob 87. By way of example, if forward movement of shaft 70 is erroneously imparted to the odometer through the instrument, knob 87 may be manually rotated to bring the odometer back into its original position before the erroneous movement if knob 87, shaft 74 and cam 26 are shifted inwardly so as to disengage cam 26.

Referring now to FIG. 7, if the unit is fully engaged as heretofore described, and if pen arm cam 27 is sized to make one revolution for every five feet of line movement and the appropriate ratio of gears 76 and 77 are used, pen arm cam 27 will force pen arm 21 to trace a sloping line 66 across the chart 36 for every five feet of line movement. While the chart 36 is advanced at a fixed and predetermined rate, pen arm 21 traces sloped line 66 across chart 36 such that the degree of slope of the line represents the instantaneous rate of penetration or velocity of the drill string. Upon completion of a revolution of pen arm cam 27, cam follower pin 33, falls into notch 41 such that pen arm 21 abruptly returns to its initial position 150 in FIG. 7. Thus, a sawtooth line or pattern is created with the spacing between peaks 65 representing a drill string movement of five feet.

The link arm cam 26 comes into contact with the cam follower surface 38 every one-half revolution of link arm cam 26. As link arm cam lobes 39 are so spaced as to cause an abrupt, but brief, pivotal movement of link arm 24 which in turn causes an equally abrupt transverse motion in pen arm 21, each revolution of link arm cam 26 produces two lateral lines 67, 68 as shown in FIG. 7. Link arm cam 26 and its corresponding gears are sized and ratioed such that lobes 39 contact follower 38 once for each foot of movement and five times for each revolution of cam 27. Therefore, when pen arm cam 27 and link arm cam 26 are used in conjunction, a sawtooth line 66 with marks or spikes 67, 68 extending from sloped line 66 as seen in FIG. 7 is formed. The peaks 65 of line 66 represent five foot intervals and the short, transverse lines or spikes 67, 68, represent one foot intervals.

Of course, if only one pen arm cam 27 is engaged, only a sawtooth pattern without one foot marks is produced.

The ratio of movement between link arm cam 26 and pen arm cam 27 may be varied, depending upon the scale desired by varying the ratio between gears 72, 77, as appropriate. Similarly, variations of the number of lobes 39 in link arm cam 26 or the shape of pen arm cam 27 can be employed to accommodate a variety of different scales.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the size, shape and arrangement of parts. For example, equivalent elements or materials may be substituted for those illustrated and described herein, parts may be reversed, and certain features of the invention may be utilized independently of the user of other features, all as would be apparent to one skilled in the art after having the benefit of this description of the invention.

What is claimed is:

1. An apparatus for mechanically measuring and recording the rate of movement of a first object with respect to a second object comprising:
    a housing frame mounted on the second object;
    a means connected to said frame and operatively connected between the first object and the second object for imparting rotary motion functionally related to the movement of the first object with respect to the second object;
    a first cam connected to the motion imparting means and rotated by said motion imparting means;
    a first arm pivotally mounted to said frame;
    a second arm pivotally mounted to the first arm, said second arm having a first cam follower surface adapted for engaging said first cam and positioning the second arm in response to the rotational movement of said first cam;
    means connected to the frame for recording the movement of the second arm; and
    means connected to said second arm for selectively disengaging the second arm from the first cam and maintaining the second arm in a fixed position independently of the rate of movement of the first object with respect to the second object.

2. The apparatus of claim 1 further comprising:
    a second cam operatively connected to the motion imparting means and rotated by said imparting means; said second cam adapted for engaging said first arm and positioning the first arm in response to the rotational movement of said second cam.

3. The apparatus of claim 2 wherein the motion imparting means is adapted for rotating the first cam a predetermined portion of a rotation for each rotation of the second cam.

4. The apparatus of claim 1 further including a biasing means attached to the frame for biasing the first cam follower surface against the first cam.

5. The apparatus of claim 1 wherein the disengaging means includes:
    a first cylinder assembly adapted for shifting between a first and second position;
    a retracting link connected between the cylinder assembly and the second arm, said link disengaging the first cam from the second arm as said cylinder assembly is shifted between its first and second position;
    a second cylinder assembly adapted for disengaging said means for imparting rotary motion as said second cylinder assembly is shifted between a first and second position; and
    a control means for shifting in unison said first and second cylinder assemblies.

6. The apparatus of claim 1 wherein the recording means includes:
    a stylus mounted on one end of the second arm;
    a time advanced cylindrical drum axially mounted on the frame adjacent said stylus; and
    a chart mounted on the drum and adapted for engagement by said stylus whereby the movement of said second arm is reflected by a series of lines made by the stylus contacting the chart.

7. The apparatus of claim 1 wherein the recording means is adapted for producing a unique signal when the second arm is disengaged from the first cam.

8. The instrument of claim 1 wherein the motion imparting means includes:
    a measuring line attached to the first object;
    a first shaft adapted for engagement with the measuring line, said first shaft being rotated by said line in proportion to the movement of the first object;
    a one-way clutch mechanism connected between said measuring line and said first shaft whereby rotary motion in only one direction may be selectively imparted to the first shaft; and
    a second shaft axially mounted within the frame and in driving engagement with the frist shaft, said second shaft connected at one end to said first cam.

9. An apparatus for mechanically measuring and recording the penetration of a drill bit connected to a drill string during oil well drilling operations comprising:
    a housing frame;
    means connected to the drill string for imparting rotary motion functionally related to the vertical movement of the drill string with respect to a stationary point;
    a first cam positioned adjacent the housing and rotated by said motion imparting means, each rotation of said first cam representative of the vertical movement of the drill string a predetermined distance;
    a link arm pivotally mounted to said housing;
    a pen arm pivotally mounted to said link arm, said pen arm having a first cam engaging means for engaging the first cam, said pen arm being positioned in response to the rotational movement of said first cam;
    means connected to said frame for recording the movement of said pen arm; and
    means connected to said second arm for selectively disengaging the second arm from the first cam and maintaining the second arm in a fixed position while said second arm is disengaged.

10. The apparatus of claim 9 wherein the pen arm includes an upper portion and a lower portion hingedly connected to said upper portion.

* * * * *